(12) United States Patent
Hartmann et al.

(10) Patent No.: US 11,253,099 B2
(45) Date of Patent: *Feb. 22, 2022

(54) DRINKS PREPARATION MACHINE

(71) Applicant: Qbo Coffee GmbH, Wallisellen (CH)

(72) Inventors: Doreen Hartmann, Zürich (CH); Wolfgang Gödde, Neuenrade (DE)

(73) Assignee: QBO COFFEE GMBH, Wallisellen (CH)

( * ) Notice: Subject to any disclaimer, the term of this patent is extended or adjusted under 35 U.S.C. 154(b) by 504 days.

This patent is subject to a terminal disclaimer.

(21) Appl. No.: 16/076,767

(22) PCT Filed: Feb. 10, 2017

(86) PCT No.: PCT/EP2017/053020
§ 371 (c)(1),
(2) Date: Aug. 9, 2018

(87) PCT Pub. No.: WO2017/137569
PCT Pub. Date: Aug. 17, 2017

(65) Prior Publication Data
US 2019/0045968 A1    Feb. 14, 2019

(30) Foreign Application Priority Data
Feb. 12, 2016 (EP) .................... 16155564

(51) Int. Cl.
A47J 31/44 (2006.01)
A47J 31/40 (2006.01)
A47J 31/54 (2006.01)

(52) U.S. Cl.
CPC ......... A47J 31/4403 (2013.01); A47J 31/402 (2013.01); A47J 31/44 (2013.01);
(Continued)

(58) Field of Classification Search
CPC ...... A47J 31/4403; A47J 31/402; A47J 31/44; A47J 31/4457; A47J 31/4485; A47J 31/545
(Continued)

(56) References Cited

U.S. PATENT DOCUMENTS

2006/0107841 A1    5/2006 Schifferle
2006/0201339 A1*   9/2006 Vetterli ............... A47J 42/50
                                                99/452
(Continued)

FOREIGN PATENT DOCUMENTS

CN    102946775    2/2013
DE    43 31 164    12/1994
(Continued)

OTHER PUBLICATIONS

English translation of International Preliminary Report on Patentability dated Aug. 14, 2018 (Aug. 14, 2018), Application No. PCT/EP2017/053020, 6 pages.
(Continued)

Primary Examiner — Phuong T Nguyen
(74) Attorney, Agent, or Firm — Rankin, Hill & Clark LLP

(57) ABSTRACT

A drinks preparation machine includes a preparation module for preparing a brewed drink from water and from an extraction material or extract and further includes a display device. The machine is configured to permit a user to make the setting of a first drinks quantity before a start of the drinks preparation, and after the start, during the drinks preparation, to permit the adjustment of a remaining drinks quantity, which is different from zero, via the operating element.

15 Claims, 4 Drawing Sheets

(52) U.S. Cl.
    CPC ....... *A47J 31/4457* (2013.01); *A47J 31/4485* (2013.01); *A47J 31/545* (2013.01)

(58) Field of Classification Search
    USPC .................................. 99/279, 280, 283, 295
    See application file for complete search history.

(56) References Cited

U.S. PATENT DOCUMENTS

| | | | |
|---|---|---|---|
| 2011/0120316 A1* | 5/2011 | Castellani | G07F 13/065 99/280 |
| 2015/0351582 A1 | 12/2015 | Roth et al. | |

FOREIGN PATENT DOCUMENTS

| | | |
|---|---|---|
| DE | 203 12 091 | 10/2003 |
| EP | 2 196 117 | 6/2010 |
| EP | 3 168 815 | 5/2017 |
| FR | 2 856 573 | 12/2004 |
| JP | 2013-532000 | 8/2013 |
| RU | 2 314 739 | 1/2008 |
| RU | 2 492 788 | 9/2013 |
| WO | 2007/003062 | 1/2007 |
| WO | 2008/138710 | 11/2008 |
| WO | 2009/135821 | 11/2009 |
| WO | 2015/016709 | 2/2015 |
| WO | 2016/046239 | 3/2016 |

OTHER PUBLICATIONS

Notice of Opposition to a European Patent dated Jan. 26, 2021, Patent No. EP 3413766, 64 pages.
European Patent Office Boards of Appeal Decision dated Jun. 13, 2019, Case No. T 0153/16, 19 pages.
YouTube Video, "Crew Review: Jura Impressa C5", Mar. 11, 2010, website https://www.youtube.com/watch?v=bX192P_FHLU; 5 pages of screenshots from YouTube Video included.
YouTube Video "Nespresse U:Bedienungshinweis", Nov. 6, 2013, website https://www.youtube.com/watch?v=uVwM8obVT-s; 5 pages of screenshots from YouTube Video included.
JURA Elektroapparate AG, "Das Buch zur IMPRESSA S9 One Touch", Jul. 12, 2020, website https://de.jura.com/-/media/global/pdf/manuals-global/home/IMPRESSA-S9-One-Touch/download_manual_jura_impressa_s9notc.pdf?a=de&hash=2A0C7109B131C74DCEA736CA115F5466C7D8306F; partial English translation included, 63 pages.
JURA Elektroapparate AG, "Das Buch zur IMPRESSEA C5", Jul. 12, 2020, website https://de.jura.com/-/media/global/pdf/manuals-global/home/IMPRESSA-C5/download_manual_jura_impressa_c5.pdf; partial English translation included, 51 pages.
English translation of Chinese Office Action dated Jul. 21, 2021, Application No. 201780010714.2; 11 pages.

* cited by examiner

DRINKS PREPARATION MACHINE

BACKGROUND OF THE INVENTION

Field of the Invention

The present invention generally relates to a drinks preparation machines for preparing drinks or the like from a portion package with a portion packaging (for example capsule) and with an extraction material (for example coffee) that is contained in the portion packaging and, more particularly, to a drinks preparation machine with a possibility of adjusting the remaining drinks quantity during the preparation process.

Description of Related Art

Numerous drinks preparation machines, with regard to which a drinks quantity can be set by way of the selection of an operating button that is envisaged for this are known from the state of the art. Thus, for example, many coffee machines include a button for a tall coffee and a button for a short coffee (espresso). The quantity that is produced in each case is generally programmable. If none of the selectable quantities are suitable or the user, after having selected the desired drink, notices that he desires a smaller quantity than specified—for example if he has placed too small a drinks vessel below the drinks outlet—such machines often provide the possibility of terminating the preparation process by way of a renewed pressing of the respective button. This, however, is unsatisfactory in the case of higher demands placed upon the selectability of the drinks quantity, since firstly a very precise timing is demanded from the user and secondly it is only possible to reduce the quantity, not to increase it.

WO 2007/003062 A1 and WO 2008/138710 A1 each disclose a coffee machine with a touch-sensitive screen (touchscreen). Both of these documents teach the adjustability of the drinks quantity via the touch screen and both teach the drinks quantity still being able to be adapted during the preparation process via a touchscreen input. Inputs via a touch screen permit a precise and, under certain circumstances, also intuitive setting/adjustment of parameters. The disadvantage of the solution according to WO 2007/003062 A1 and WO 2008/138710 A1 with an adjustability also during the preparation process is, however, the fact that the taught solution is not optimal in view of the fact that in this case there is very little time available to the user, since indeed according to definition the preparation process is underway during the input. It has been found again and again that the users, when pressed for time, often make mistakes on using the touch screen, for example by way of them touching the touchscreen at the wrong location or by way of them removing the finger with a dragging movement after the actual input and therefore inadvertently actuating a further input that then can no longer be corrected or no longer be corrected to a satisfactory extent due to a lack of time—which can lead to unnecessary stress or displeasure on the part of the user. Furthermore, the processing of a touchscreen input by way of the corresponding input unit is relatively time-consuming, and this leads to delays, which is potentially disadvantageous given a later input during the preparation process.

SUMMARY OF THE INVENTION

Starting from the state of the art, it is therefore the object of the invention to provide a drinks preparation machine of the initially mentioned type which overcomes disadvantages of the state of the art and which permits an as user friendly as possible adjustment of the drinks quantity.

A drinks preparation machine according to the invention includes a preparation module for preparing a brewed drink from water and from an extraction material or extract and further includes a display device. It is configured to permit the setting of a first drink quantity by the user before a start of the drinks preparation, and, after the start, during the drinks preparation and via a physical operating element, to permit the adjustment of a remaining drinks quantity, the quantity being different to zero.

The fact that the drinks preparation machine or a system with a drinks preparation machine is "configured" to carry out the steps means that there would not only be the possibility of carrying out the respective steps, but specific measures (hardware, programming) are applied in the machine, in order to carry out these steps given designated operation.

According to the invention therefore, in contrast to the state of the art, the preparation procedure is not merely optionally terminated via a physical operating element, but the user can also still carry out an adjustment according to requirements during the brewing process. The drinks preparation machine, for example, can be configured, under suitable preconditions (if the preparation process is not yet so far advanced that the first drinks quantity has already been prepared and if the first drinks quantity does not correspond to an adjustable maximal value) to select the total drinks quantity (including the already prepared share) larger as well as smaller in comparison to the first drinks quantity.

In particular, the adjustment of the remaining drinks quantity can be effected via the adjusting (adaptation) of a total drinks quantity of the complete drink or of a drinks constituent. If the total drinks quantity, which is adapted during the drinks preparation, is greater than the already prepared drinks quantity, then the remaining drinks quantity corresponds to the difference. If it is equally large or, inasmuch as such a selection is permitted, smaller, then the preparation procedure is terminated, i.e. the remaining drinks quantity that is selected by the user is 0.

A physical operating element, in contrast to a touch-sensitive screen, is an element that is physically movable relative to a housing of the drinks preparation machine, for example a rotary wheel (which can optionally be designed as a rotary push button with an activation movement in the axial direction with respect to the rotation axis or also for example in the manner of a scroll wheel, possibly with an activation movement in the radial direction with respect to the rotation axis), a slide lever, a control stick (in the manner of a joystick), a rocker switch, etc.

In particular, the presently adjusted remaining drinks quantity can be adjusted and corrected in particular by way of actuating the physical operating element (in particular in both directions), until the user does a confirmation input, for example an activation movement of the rotary-push button or another rotary wheel, the actuation of a separate physical actuation element, a confirmation via a touch-sensitive screen, etc.

The display device can be configured to display the current adjustment of the remaining drinks quantity in real-time in a direct manner. Such a display can be effected numerically and/or graphically. It can be particularly advantageous if the adjusted, remaining drinks quantity or the total drinks quantity can be represented by the display device graphically in relation to the already prepared drinks quantity and/or to a maximal possible drinks quantity and/or possibly to the first drinks quantity.

In embodiments, on adjusting the remaining drinks quantity, the already delivered drinks quantity can be represented by a display element. Such a display element can be designed, for example, as a progress bar. Here, a progress bar is any so-called bar-graph display, with which the quantity to be represented is represented by the extension of a graphic element in one direction (the "length" of the "bar")—even if the shape differs from a pure bar shape, for example by way of the bar appearing as a drinks vessel, with a constant diameter or one which is not constant along the progress direction. Other diagram forms are also conceivable as an alternative to the progress bar, for example a circular shape with a sector which displays the progress and becomes continuously larger, etc.

In such embodiments with a graphic representation of the delivered drinks quantity in real-time, on adjusting the remaining drinks quantity, a dedicated display object which represents the adapted drinks quantity (delivered drinks quantity plus remaining drinks quantity) can be movable relative to the display element, for example a line which moves relative to the progress bar, an arrow or the like.

Particularly in embodiments, in which the already prepared drinks quantity is determined in real time, the adjusted/adapted drinks quantity can be compared to the determined, already prepared drinks quantity, for the adjustment of the remaining drinks quantity, wherein for example an adjustment of a total drinks quantity smaller than the already prepared drinks quantity (corresponding to a physically senseless negative remaining drinks quantity) is not permitted.

In embodiments, in which the already delivered drinks quantity is represented in real time, then the representation can be scaled such that a maximum quantity (100%; for example "the bar/the item is completely filled") corresponds to the previously set first drinks quantity, as is known per se. In the case of an actuation of the physical operating element for the purpose of a belated adaptation of the remaining drinks quantity, according to an option, the display element can be scaled afresh and specifically such that a maximally settable drinks quantity which is specified at the machine corresponds to the maximal quantity, wherein then optionally the first drinks quantity is likewise represented by a separate further display object (line, arrow etc.). After confirmation of the adapted remaining drinks quantity by the user, either the display is scaled afresh such that the maximum quantity corresponds to the adjusted (now adapted) drinks quantity, or the scaling can also remain as it was during the adaptation.

The setting of the first drinks quantity can be a setting ability via a touch screen. Such a touchscreen can be present at the drinks preparation machine itself or at an operating appliance which can be brought into communicating connection with this, for example a mobile telephone, in particular smartphone, with a suitable user interface and corresponding software enabling the device to be an operating appliance.

Supplementarily or alternatively to a settability/adjustability via a touch screen, a setting ability via different means, for example likewise via the physical operating element, for example via by way of selection from one or more suggestions or directly by way of the selection of a quantity specified in numbers etc. is also considered for the setting of the first drinks quantity.

In particular, the setting of the first drinks quantity is different from the mere pressing of one or more start buttons.

It permits for example the selection and if required correction of the first drinks quantity until the user gives a corresponding confirmation signal. Such a confirmation signal for the drinks preparation machine can simultaneously be a start signal, in particular when the setting of the first drinks quantity is effected at the drinks preparation machine itself. However, a separate start signal can also be demanded, for example when the setting of the first drinks quantity is effected via a separate operating appliance and the confirmation signal activates the transfer of the adjusted drinks quantity to the drinks preparation machine—a separate start signal can then yet still be necessary at the drinks preparation machine itself, in particular in order to prevent a drinks preparation from being inadvertently activated without a drinks vessel having been placed in situ.

In particular, the brewed drink that is prepared by the preparation module is coffee, possibly also another hot drink. The preparation module is accordingly in particular a coffee machine or a part of a coffee machine. In particular, it can be designed as a drinks preparation module with a brewing module for receiving a portion package of the aforementioned type, in particular a portion capsule which is filled with an extraction material (for example coffee powder).

Generally, apart from the brewing module, for example for receiving the portion package, the preparation module also includes further elements as are known per se for drinks preparation machines, for example a water tank, a fluid pump and a water heating means that are arranged successively in the flow direction and upstream of the brewing module, in order to supply the brewing module with hot water which then, particularly in a portion package of the mentioned type, is brought into contact with the extraction material or possibly with the extract.

Very generally, the drinks quantity (the first drinks quantity or the adapted remaining drinks quantity) can be the total drinks quantity, or it can also be a quantity of a drinks constituent or a ratio between drinks constituents.

In particular in a group of embodiments, apart from a preparation module for a brewed drink as a drinks constituent, the drinks preparation machine also includes a milk module for the delivery of milk as another drinks constituent. The drinks preparation machine can include an outlet that is designed such that the brewed drink and the milk can be delivered into one and the same drinks vessel, the drinks vessel being placed on a placement platform (i.e. without the drinks vessel having to be repositioned between the delivery of the brewed drink and the delivery of the milk).

Milk, which is delivered by such a milk module, can be delivered in the form of liquid warm or cold milk and/or as warm or cold milk froth. Accordingly, the milk module can include a milk delivery device and/or milk frother appliance, for example for the selective delivery of milk and/or for heating the milk and/or for preparing cold or hot milk froth. The milk module can additionally include a milk vessel.

The preparation module and such a milk module can be integrated together in a common unit. Alternatively, the preparation module and a milk module can also be present in separate devices which can be coupled to one another. In particular, as is described in PCT/EP2015/071795, they can include a base unit with a preparation module, and, dockable onto this, the milk module as a device that is dockable via a docking element and is activated and supplied with electricity and steam from the base unit. In this case, in which the milk module cannot function as an autonomous machine, the base unit and the milk module can together form the drinks preparation machine.

In embodiments with a preparation module and a milk module, a display device of the mentioned type can be equipped in order to display the cumulative quantity of the delivered brewed drink and of the delivered milk via a common display element. In embodiments, the display element thus indicates a filling level, which represents an added quantity, for example an added volume, of the two drinks shares (brewed drink, delivered milk).

In embodiments of the mentioned group with a milk module, the remaining drinks quantity, which according to the invention can be adjusted during the preparation process, can be a remaining drinks quantity of the brewed drink and/or of the milk, and in the latter case the post-adjustability can optionally also include an adjustability of the milk froth quantity. If several drinks constituents are present (wherein milk and milk froth can be considered together as a drinks constituent or as separate drinks constituents and the drinks preparation machine can be configured accordingly), the adjustability can each include an adjustability of an absolute value of the remaining drinks quantity and/or an adjustability of a quantity ratio.

Other drinks constituents are also conceivable supplementarily or alternatively to milk, for example a syrup etc.

Apart from the drinks preparation machine, a method for operating a drinks preparation machine is also the subject-matter of the present invention. This method is characterised in that the drinks preparation machine at least partly carries out the aforementioned steps, for which it is configured.

BRIEF DESCRIPTION OF THE DRAWINGS

The subject-matter of the invention is explained in more detail by way of preferred embodiment examples depicted in the accompanying drawings. In each case in a schematic manner are shown in.

DETAILED DESCRIPTION OF THE INVENTION

Figure 1:
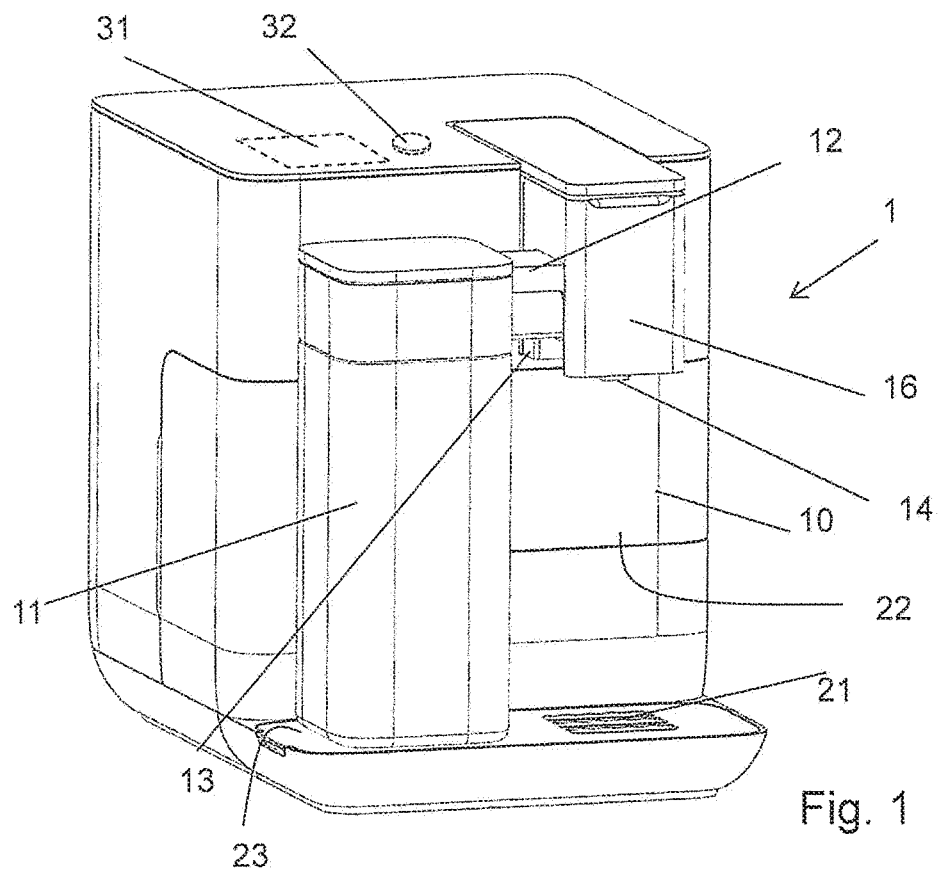
FIG. 1 shows a drinks preparation machine with a preparation module, a milk module and a common activation.

The reference numerals that are used in the drawings and their significance are listed in a grouped manner in the list of reference numerals. Basically, the same reference numerals indicate the same or analogous elements in the drawings.

FIG. 1 shows a view of a drinks preparation machine 1 with a base unit 10, which here is designed as a capsule coffee machine and includes the preparation module and with a milk frother appliance 11 that can be coupled onto the base unit and serves as a milk module. A docking element 12 of the type described in PCT/EP2015/071795 taps respective interfaces of the base unit or appliance, leads water, steam and possibly air from the base unit into the milk frother appliance and also forms an electrical connection for the supply of voltage and/or for transmitting activation signals of active elements (in particular of a pump) of the milk frother appliance. Furthermore, the docking element forms a milk outlet 13 which in the docked condition lies next to the brewed drink outlet (here coffee outlet 14) of the base unit 10.

The base unit, as is known per se for coffee machines, includes a water container, a water pump and a water heater. A brewing chamber for preparing coffee from heated water by way of extraction from coffee power is moreover present, the coffee powder being provided here in a portion capsule that was previously inserted into the coffee machine before the preparation. As an alternative to the drawn embodiment as a portion capsule system, the coffee machine can also be designed as a so called bean-to-cup coffee machine which also includes a coffee mill and grinds the coffer powder in a portioned manner and feeds it to the brewing chamber. As yet a further alternative, particularly if the coffee machine is designed as a piston machine, i.e. the brewing chamber is formed between a fixed part and a removable piston, one can yet also envisage the coffee power being brought into the brewing chamber by the user in a manner in which it is already in the ground, but loose (non-compacted) condition.

The coffee machine can further include a capture container for spent coffee powder portions (in capsules or in a loose manner, depending on the design of the coffee machine).

A placement platform 21 for placing a drinks vessel is formed on the coffee machine. This can be formed, for example, by way of a grating, below which a capture dish is located. In embodiments, the placement platform can be height-adjustable in a suitable manner.

A coffee outlet 14, through which the brewed coffee runs out and gets into the cup or vessel lying therebelow, is located above the placement platform 21. This outlet is located below an outlet hood 16, which forms part of the coffee machine housing and at least partly covers the outlet to the front and to the sides.

The base unit 10 forms a front 22, from which, as is known per se from other coffee machines, on the one hand the placement platform 21 and on the other hand, above this, the outlet hood 16 projects.

Here, a milk frother platform 23, on which the docked milk frother appliance 11 is placed, likewise projects from the front.

A connection location for the connection of the docking element onto the coffee machine is located in the proximity of the coffee outlet 14 and here laterally on the outlet hood 16. This connection location includes a steam delivery location for coupling onto the steam connection of the docking element, and possibly a hot water and/or steam delivery location 112 for coupling onto the feed-through conduit for a cleaning fluid (hot water/steam) for the milk frother appliance. The steam delivery location and the hot water and/or steam delivery location, when required, are respectively supplied with steam and hot water from the water heater, wherein for example a multi-way valve in the inside of the coffee machine can selectively feed heated liquid or steam to the brewing module, the steam delivery location or the hot water and/or steam delivery location.

Furthermore, a display device 31 and an operating element 32 are present and these are arranged on the base unit 10 in the represented embodiment example. Together they form the appliance's own user interface 30 (see FIG. 3).

The display device 31 is a display, without or possibly with a touchscreen functionality.

The operating element 32 is a physical operating element and here is designed as a rotary push button, as is known from many household appliances. The rotary push button can be programmed such that one can select between different elements that are available for selection (different menu points, different preparation prescripts, drinks quantities which differ from one another by way of steps, etc.) and the current selection, which is displayed via the display device, is confirmed by way of pressing in the axial direction.

Other operating elements, combinations of operating elements or integrated solutions, for example with a touch-screen which forms the display device as well as the operating element, are also conceivable.

In the present embodiment example and generally often preferred, the drinks preparation machine is designed such that it is fully capable of functioning as a standalone appliance and can be operated without the external operating appliance, which is described hereinafter, i.e. all inputs and information outputs, which are actually necessary for operation can be effected via the appliance's own user interface, which does not rule out certain functionalities that are not necessary for operation—for example the adjustment of relative quantities—optionally requiring an input via the operating appliance.

Here too, the base unit (capsule coffee machine) is designed such that it can also be operated without the milk module, wherein preferably the presence or absence of the milk module can be detected and the respective (milk-) functions are only available when the milk module is coupled.

Figure 2:
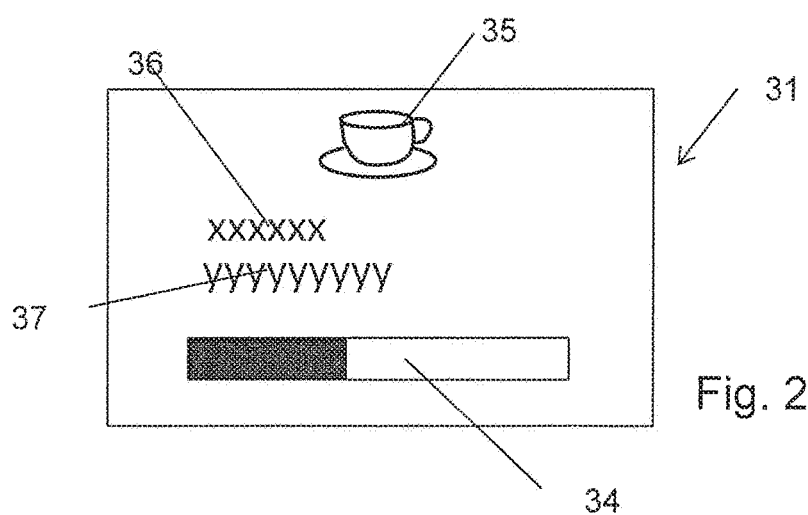
FIG. 2 shows a display device.

The display device 31 can be seen in FIG. 2. It includes a display element 34. This here is designed as a progress bar (bar-graph display).

In the represented embodiment example, the display element is designed as a plain bar. However, it is also possible to provide such a progress bar with graphic elements, for example by way of colour selection, suitably designed shapes, moving elements etc.; and a representation of the progress bar for example in the form of a drinks vessel is not ruled out.

Apart from the display element 34, further information, for example a symbol 35, which indicates the type of the procedure (brewing the drink, cleaning procedure, etc.), is displayed on the display device 31. A matching symbol can be displayed for each phase of the drinks preparation (brewing procedure, milk preparation, etc.). However, it is of course also conceivable to display the same symbol during the complete preparation of the drink. A first detail 36 is moreover present and this for example can represent the variety of the brewed drink, which is recognised by a capsule recognition device (specifically the name of a capsule variety for example). A second detail 37 can, for example, represent the drink that is selected by the user via the operating element and/or via the separate operating appliance, thus for example "milk coffee" "latte macchiato", a user-defined and accordingly specifically named recipe (preparation prescript), etc.

Supplementarily or alternatively, instructions to the user can also be displayed, for example—depending on the selected recipe—"please now add caramel syrup" or "supplement with ice cubes" or also maintenance instructions such as "please refill the milk container with milk".

Figure 3:
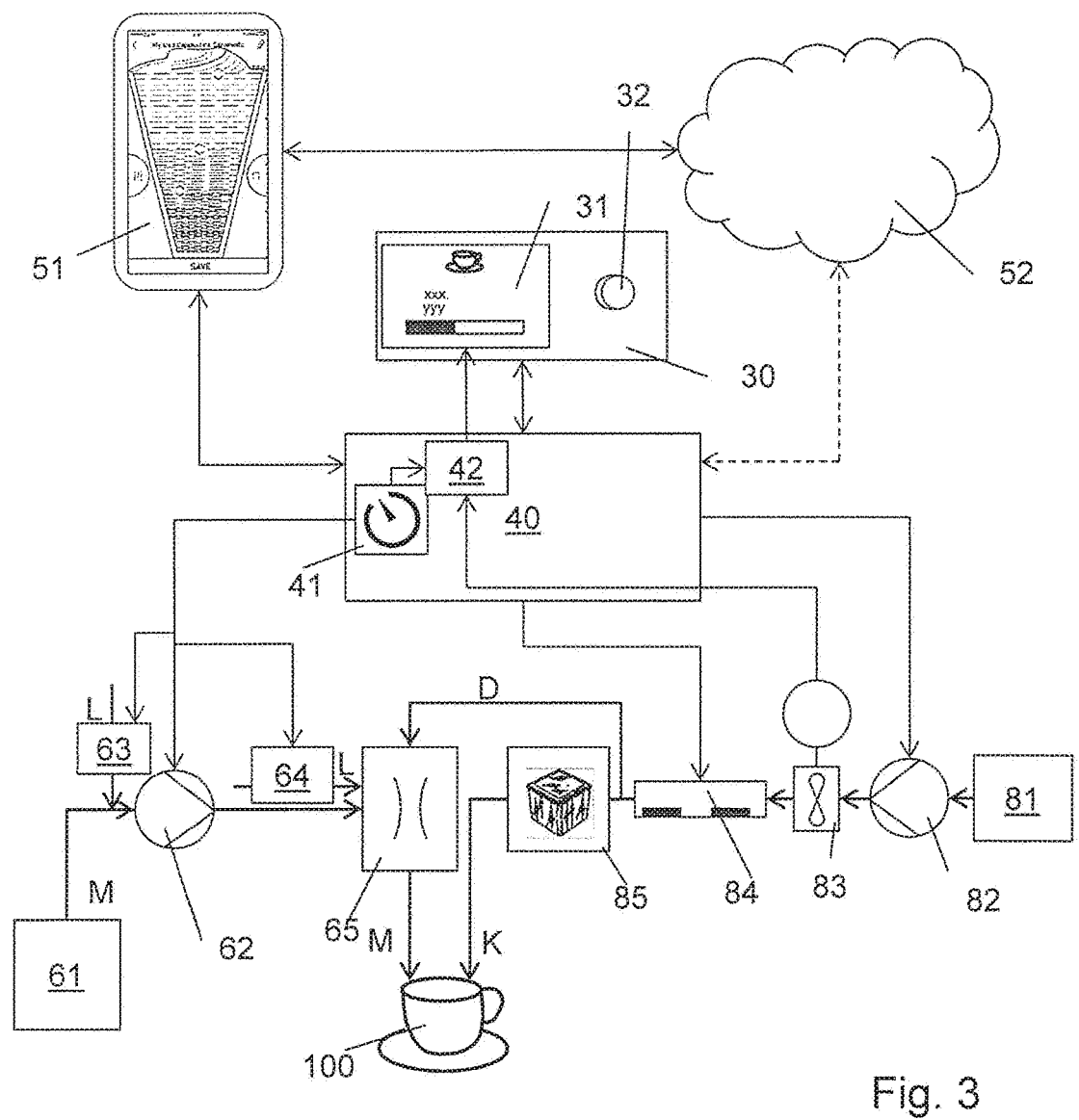
FIG. 3 shows a schematic diagram of a drinks preparation system with the drinks preparation machine and an operating appliance.

FIG. 3 shows a schematic diagram of the drinks preparation system which apart from the drinks preparation machine which is described by way of FIG. 1 also includes an optional operating appliance 51.

The operating appliance can be connected to a network 52, for example the internet or intranet, and it is also possible for a direct connection to additionally exist between such a network 52 and the drinks preparation machine.

The drinks preparation machine includes a central control unit 40 (superordinate to possible controls of the elements of the base unit and of the milk module or containing these controls). The control unit 40 is also configured for a communication connection with the user interface 30 and possibly with the operating appliance 51 and is provided with or connected to corresponding communication means. In particular, the optional operating appliance 51 can communicate with the control unit 40 in a wireless manner (for example by way of Wi-Fi, Bluetooth, etc.) or if need be in a manner connected by wire (for example by way of Ethernet, USB).

In this text, the term "control unit" does not necessarily imply that the control unit is a physical unit. In contrast, under certain circumstances it can include physically separate sub-units.

An operating appliance 51 of the described type can be designed as a smartphone and be configured and provided with software, in order to assume the functions that are described in the European patent application 15 194 735.5 which is explicitly referred to here. It includes a user interface, for example a touch-sensitive screen (touchscreen) that functions as an input and output unit. Additionally or alternatively, buttons of the operating appliance can also serve as input units. A voice input can be realised additionally or alternatively to this.

If an operating appliance 51 is present, then information can be outputted to the user and inputs of the user can be inputted, via the user interface 30 and/or the operating appliance 51.

The control unit 40 includes a memory, in which, amongst other things, preparation prescripts can be stored. A preparation prescript includes control information that can be converted into commands for the control of the base unit 10 and of the supplementary unit 11. Such control information on the one hand includes sequence information that specifies a sequence of steps that are to be carried out by the base unit 10 and/or the milk module 11 for producing a total product. On the other hand, the control information includes for example temperatures, volume details, time details, etc.—hereinafter generally also called preparation parameters—which parameterise a sequence.

Sequence information represents for example "switch on the water heating means; switch on the pump of the brewing module for fifteen seconds; wait for at least five seconds after switching off the pump until the water heating means is at temperature desired for steam generation; switch on the milk pump for twelve seconds and simultaneously open the steam valve". The times and temperatures that are mentioned in this example can be specified by preparation parameters and/or be determined by the control in accordance with other preparation parameters and measured values of sensors.

A preparation prescript can also include user instructions. These instructions are part of the preparation of the total product and must be carried out by a user. For this, the user instructions can be displayed via the user interface 30 and/or possibly via the operating appliance 51. For example, such user instructions are "now add ice cubes" or "please measure 20 ml caramel syrup" or "now add the prepared caramel syrup" or "please stir" or "please examine whether the inserted capsule and selected recipe match" etc. A user instruction can be accompanied by a visual representation, for example of the total product to be created, of a selected or actually inserted capsule etc.

For preparing a product, control information or corresponding commands are implemented by the base unit 10 and the supplementary unit 11 in accordance with the preparation prescript and a preparation sequence is realised by this. If the preparation prescript includes user instructions, then these are displayed to the user at corresponding locations of the sequence. For example, after an acknowledgement by the user by way of the operating element 32 or possibly via the operating appliance, the subsequent control information of the preparation sequence is implemented.

A preparation prescript can include preparation parameters that may be adapted by the user, as well as preparation parameters that cannot be adapted by the user. Adaptable preparation parameters, for example, are (volume) shares of drinks constituents in the total product, a total quantity, or the temperature of a drinks constituent. For adaptable preparation parameters, the preparation prescript can include a standard value or default value that is used if the user does not adapt the parameter.

A selection of one or more such preparation parameters is displayed to the user via the user interface 30 or possibly via the operating appliance 51 and an input of the user for adapting the preparation parameter is detected, for adapting adaptable preparations parameters. The input can be effected by way of actuating real buttons and/or virtual buttons such as keys or "buttons" in particular "arrow keys" and/or displaceable markings or "sliders" on a touchscreen of the operating appliance 51.

In FIG. 3, the path of the brewing fluid into a drinks vessel 100, which is placed on the placement platform, is represented from the very right to the left, and the path of the milk into the same drinks vessel is shown from the very left to the right.

As the brewing liquid, water is delivered by a water pump 82 from a water tank 81 to a water heating means 84—continuous heater or boiler—, where it is heated to a brewing temperature, for example to a temperature of between 90° C. and the boiling point, for preparing the brewed drink. A flowmeter 83 (here illustrated as a turbine wheel flowmeter), which measures the flow of the liquid which is delivered by the pump, is arranged on the path to the water heating means, i.e. between the water tank 81 and the pump 82 or, as drawn, between the pump 82 and the water heating means 84. The water gets from the water heating means into the brewing module 85 where it is delivered here through a capsule, which is filled with ground coffee powder, for the extraction process. The brewing fluid is then delivered as coffee K via the coffee outlet and gets into a drinks vessel 100 which is placed below this. The heated water can selectively also be vapourised and be fed to the milk module as steam D, or be fed to the milk module for example as a cleaning fluid (the latter alternative is not illustrated in FIG. 3).

The milk M is delivered out of a milk vessel 61, in particular by a milk pump 62 that is designed, for example, as a gear pump as is described in PCT/EP2015/071795. Depending on the desired preparation type, the milk can be frothed in a cold manner by way of this pump, amid the feed of air L (first air valve 63). The milk gets from the milk pump 62—under certain circumstances at least partly as milk froth—into a mixing nozzle 65, where, depending on the desired preparation type, it is heated amid the feed of steam D and/or is frothed amid the feed of air (second air valve 64). It then gets from there through the milk outlet into the drinks vessel 100.

The first as well as the second air valve 63, 64 can be activated for example. The temperature as well as the froth share can be controlled within limits by way of the selection of the air feed via the first air valve 63 and/or the second air valve and/or the feed of steam. With regard to this, functioning principles of a possible milk module are described in the mentioned PCT/EP2015/071795, which is explicitly referred to inasmuch as this concerned.

The control unit 40 activates the water pump 82, the milk pump 62 and the valves 63, 64 and also controls the flow of the heated water or steam (into the brewing module 85, the mixing nozzle, possibly a path for cleaning fluid), for example via an activatable multi-way valve (not represented in FIG. 3). The control unit 40 is also in communication connection with the user interface 30. For determining the filling level, which is outputted via the display element 34, on the one hand the result of the measurement by the flowmeter 83 is take into account and on the other hand the time during which milk is delivered, under certain circumstances depending on the opening condition of the air valves 63, 64 (i.e. depending on whether one froths or not and possibly under certain circumstances also on how large the froth share is) and/or on a steam feed into the mixing nozzle. This is represented in FIG. 3 by a timer 41, which detects the time for the milk preparation and transfers it further to a device for determining the fluid level 42, the device being located in the control unit 40 and to which the results of the flow measurement are also led.

Figure 4A:
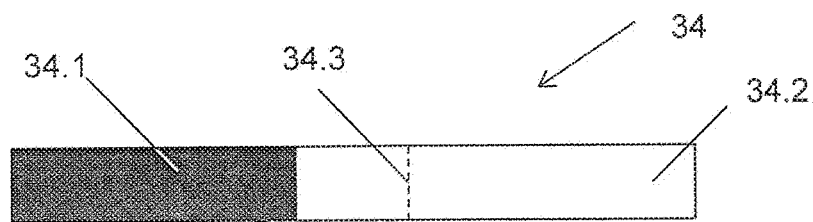
FIGS. 4a, 4b show the progress bar of the display device at different points in time during the drinks preparation.
Figure 4A:
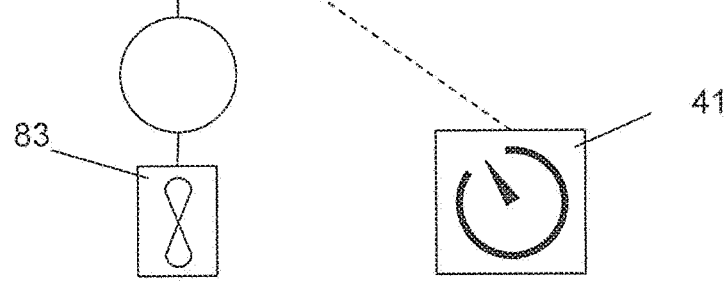
Figure 4B:
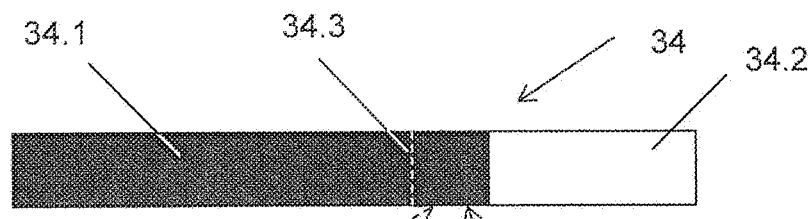
Figure 4B:
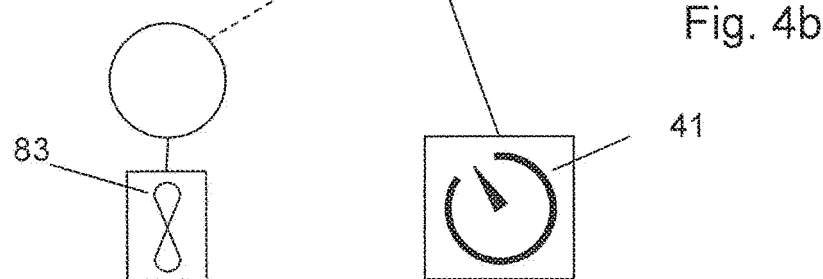

FIGS. 4*a* and 4*b* show the display element 34 (the progress bar) during different phases of the drinks preparation. In a first phase (FIG. 4*a*), the one drinks constituent is prepared and the respective progress is represented by way of the growing filled-out bar part 34.1. The first drinks constituent, for example, can be the brewed drink, whose filling level is determined by the flowmeter 83 (unbroken arrow). Conversely, the milk constituent can be prepared first of all, depending on the recipe, in which case the filled-out bar part grows during the first phase, for example as a function of time (dashed arrow). In the second phase (FIG. 4*b*), the second, other drinks constituent or component is prepared, wherein to the user, the filled-out bar part 34.1 simply grows at the expense of the non-filled bar part 34.2. The at least partly simultaneous preparation of the drinks constituents is also not to be ruled out and is then taken into account by way of a corresponding more quickly growing bar.

The display element can optionally also include details on which part represents the first drinks constituent and on which part represents the second drinks constituent, here in the form of a separating line 34.3.

Independently of whether such a detail is present or not, the relative share of the drinks constituents with regard to the complete display element (here the progress bar) can be set in a fixed manner or be dependent on the recipe. In the latter case for example it can reflect the relative volume shares, wherein the different densities of milk and milk froth can be taken into account or not.

If the user wishes to adapt the drinks quantity or the quantity of one of the drinks constituents during the preparation process, he actuates, for example, the operating element 32—e.g. by way of rotating the rotary push button—or makes a corresponding input in another manner. The display according to FIG. 4*a*/FIG. 4*b* on the display device is then replaced by another display, for example corresponding to FIG. 5*a* or 5*b*.

Figure 5A:
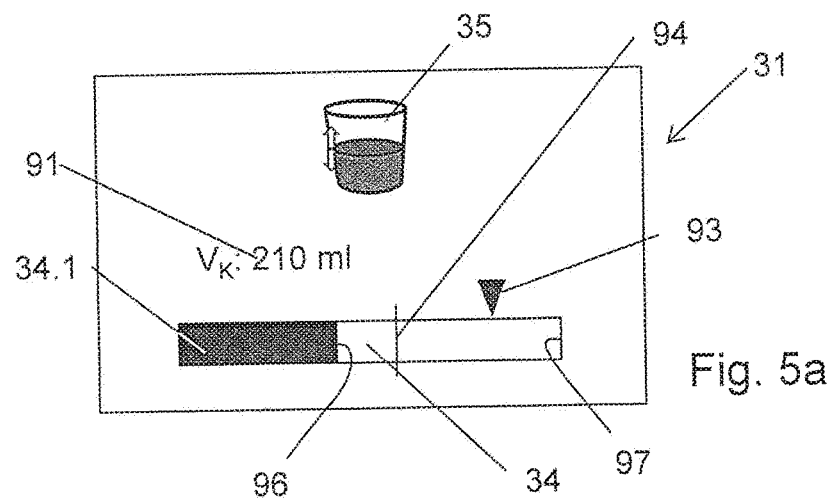
FIGS. 5a, 5b show the display device during a later adaptation of the brewed drink quantity or milk quantity.

FIG. 5*a* shows the adaptation of the brewed drink quantity (coffee quantity), to which the user is led if he actuates the operating element during the preparation of the brewed drink, here in particular by way of rotating the rotary push button (the same or optionally another step, for example an interruption of the preparation procedure and/or the display of a menu selection can be envisaged given an actuation by way of pressing). Apart from another symbol 35, which is adapted, for example, to the step to be carried out, the display element 34 although appearing in a representation analogous to FIG. 4a/FIG. 4b, this however is to a different scale. The total length of the progress bar (corresponding to 100%) now no longer corresponds to the total drinks quantity according to the selected preparation prescript, but to the maximally possible preparable brewed drink quantity—for example 350 ml, 300 ml, 280 ml, 250 ml, 200 ml or another value that generally lies between 150 ml and 400 ml and that, for example, is dependent on the machine. The length of the filled-out bar part 34.1 consequently corresponds to the percentage share of the already prepared brewed drink quantity to the maximal possible quantity.

Additionally to the actual display element, two further display objects appear: the adjusting arrow 93 can be displaced to the right or left by way of actuating the operating element (rotating the rotary push button) and corresponds to the currently selected total drinks quantity. An optional marking 94, which represents the first drinks quantity according to the preparation prescript and simultaneously represents the starting point for the adjusting arrow 93, from which starting point this arrow can be moved to the right or to the left, also appears. The current, measured, already prepared drinks quantity serves as a lower limit 96 for the selectable values. The upper limit 97 is the mentioned value for the maximally possible preparable brewed drink quantity, which is defined by the machine.

In the represented embodiment example, the corresponding numeric value 91 for the selected drinks quantity is represented simultaneously with the adjusting arrow 93. Optionally and supplementarily or alternatively to the progress bar, the representation of the symbol 35 can also change on adjusting the value, by way of the shown filling level being (co-) moved.

As soon as the user has reached the desired brewed drink quantity, he then confirms the selection by way of pressing the rotary push button. The remaining quantity corresponds to the difference between the selected quantity and the already prepared quantity.

Figure 5B:
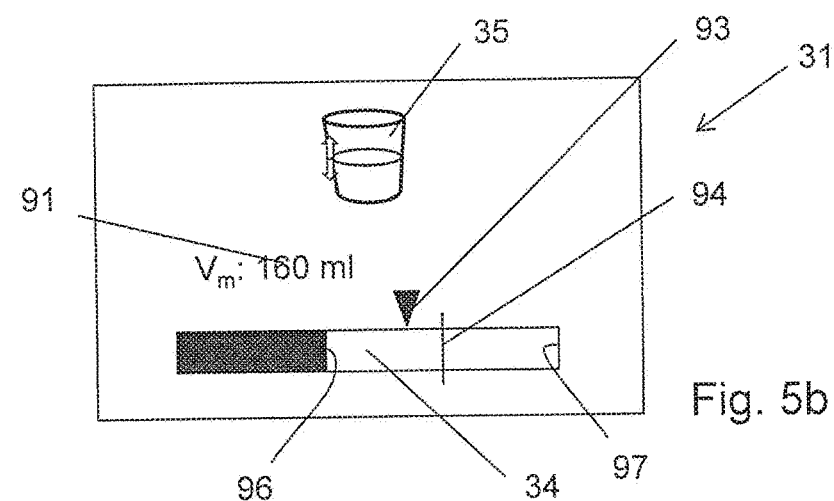

If the rotary push button is actuated during the delivery/preparation of the milk, then as is illustrated in FIG. 5b, a display, which is quite analogous to the previous one, appears, again with the possibility of moving the adjusting arrow 93 between the maximal value 97 and the already prepared/delivered milk quantity as a lower limit 96 and then confirming the made section. In contrast to FIG. 5a, an adaptation of the quantity downwards in comparison with the first drinks quantity is represented in FIG. 5b. The fact that the milk quantity and not the brewed drink quantity is adapted can be represented, for example, by way of an adapted symbol 35 (here with a lighter colouring of the drink), by way of an adapted inscription of the numerical value 91 and/or by way of further measures (colouring of the progress bar etc.).

LIST OF REFERENCE NUMERALS

1 drinks preparation machine
10 base unit (coffee machine)
11 milk frothing unit
12 docking element
13 milk outlet
14 coffee outlet
16 outlet hood
21 placement platform
22 front
23 milk frothing platform
30 user interface
31 display device
32 operating element
34 display element
34.1 filled-out bar part
34.2 non-filled-out bar part
34.3 separating line
35 symbol
36 first detail
37 second detail
40 control unit
41 timer
42 device for determining the filling level
51 operating appliance
52 network
61 milk vessel
62 milk pump
63 first air valve
64 second air valve
65 mixing nozzle
81 water tank
82 water pump
83 flowmeter
84 water heating means
85 brewing module
91 numerical value
93 adjusting arrow
94 marking for the first drinks quantity
96 lower limit
97 upper limit
100 drinks vessel

The invention claimed is:

1. A drinks preparation machine, comprising:
a housing,
a preparation module for preparing a brewed drink from water and from an extraction material or extract,
a display device, and
a physical operating control that is actuatable by being physically moved relative to the housing,
wherein the physical operating control is a rotary push button;
wherein the drinks preparation machine is configured to permit a user to make a setting of a first drinks quantity before a start of a drinks preparation,
wherein the drinks preparation machine is further configured so as, after the start of and during the drinks preparation, to permit an adjustment of a remaining drinks quantity to an amount different from zero, via the physical operating control, and
wherein the remaining drinks quantity remains adjustable by actuation of the physical operating control and correctable by actuation of the physical operating control, until a confirmation input is made by the user.

2. The drinks preparation machine according to claim 1, wherein said machine is configured to determine and graphically display an already delivered drinks quantity in real time via the display device.

3. The drinks preparation machine according to claim 1, wherein said machine is configured to determine an already delivered drinks quantity and is configured, given an adjustment of the remaining drinks quantity, to graphically represent the already delivered drinks quantity and, in relation to this, a sum of a delivered drinks quantity and of an adjusted remaining drinks quantity.

4. The drinks preparation machine according to claim 3, wherein said machine is configured to also represent, in relation to the delivered drinks quantity and to the sum of the delivered drinks quantity and the adjusted remaining drinks quantity, one or both of:
- the first drinks quantity;
- a maximum drinks quantity that is preparable by the machine.

5. The drinks preparation machine according to claim 1, comprising a touch-sensitive screen, wherein the first drinks quantity is settable via the touch-sensitive screen.

6. The drinks preparation machine according to claim 1, further comprising a milk module for delivering milk.

7. The drinks preparation machine according to claim 6, wherein the display device is configured to display a cumulative quantity of the delivered brewed drink and of the delivered milk via a common graphic display element.

8. The drinks preparation machine according to claim 6, wherein the adjustable remaining drinks quantity is a quantity of one or both of:
- the brewed drink;
- the milk.

9. The drinks preparation machine according to claim 8, wherein the machine is configured, given an actuation of the physical operating control during the preparation of the brewed drink, to permit adjustment of the remaining drinks quantity of the brewed drink and given an actuation of the physical operating control during the delivery of milk, to permit the adjustment of the remaining drinks quantity of the milk.

10. The drinks preparation machine according to claim 1, wherein the adjustment of the remaining drinks quantity is effected via a rotation of the rotary push button and wherein the adjustment is confirmed by pressing of the rotary push button.

11. The drinks preparation machine according to claim 1, wherein the preparation module for the brewed drink comprises a brewing module for receiving a portion package, which is filled with coffee powder.

12. The drinks preparation system comprising a drinks preparation machine according to claim 1 and further comprising an operating appliance with an operating appliance user interface, wherein the operating appliance and the drinks preparation machine are bringable into communication connection with one another, and wherein an input of the first drinks quantity is accomplishable via the operating appliance user interface, and a preparation prescript derived from said input is transmittable from the operating appliance to the drinks preparation machine.

13. A method for operating the drinks preparation machine according to claim 1, comprising the steps of:
- selecting a first drinks quantity;
- starting the preparation process;
- actuating the physical operating control to adapt the first drinks quantity and thereby adjust the remaining drinks quantity; and
- continuing the preparation process until the adapted drinks quantity is reached.

14. The method according to claim 13, wherein a confirmation of the adapted drinks quantity is effected after actuating the physical operating control.

15. The method according to claim 13, wherein the step of selecting the first drinks quantity is effected via a touch-sensitive screen.

* * * * *